US006761080B2

(12) United States Patent
Lange et al.

(10) Patent No.: US 6,761,080 B2
(45) Date of Patent: Jul. 13, 2004

(54) MULTIPLE STAGE, MULTIPLE EXTEND, SPEED REDUCING BALL SCREW LINEAR ACTUATOR AND METHOD OF CONSTRUCTING AND OPERATING THE ACTUATOR

(75) Inventors: David A. Lange, Bay City, MI (US); Sid M. Zimmerman, Pacific Palisades, CA (US)

(73) Assignee: Thomson Saginaw Ball Screw Co., LLC, Saginaw, MI (US)

( * ) Notice: Subject to any disclaimer, the term of this patent is extended or adjusted under 35 U.S.C. 154(b) by 0 days.

(21) Appl. No.: 10/386,776

(22) Filed: Mar. 12, 2003

(65) Prior Publication Data

US 2003/0167867 A1 Sep. 11, 2003

Related U.S. Application Data

(63) Continuation of application No. 09/841,216, filed on Apr. 24, 2001.

(60) Provisional application No. 60/200,120, filed on Apr. 27, 2000.

(51) Int. Cl.[7] .................................................. F16C 27/02

(52) U.S. Cl. ....................... 74/89.37; 74/89; 74/424.81; 74/424.71

(58) Field of Search ...................... 74/89, 89.23, 89.33, 74/89.37, 89.36, 89.39, 89.35, 424.71, 424.81, 424.82; 192/141; 440/58

(56) References Cited

U.S. PATENT DOCUMENTS

| | | | | | |
|---|---|---|---|---|---|
| 2,417,434 | A | * | 3/1947 | Mead et al. | 192/143 |
| 2,504,018 | A | * | 4/1950 | Gibson et al. | 192/48.1 |
| 2,620,911 | A | * | 12/1952 | Alfred | 192/141 |
| 2,623,403 | A | * | 12/1952 | Terdina | 74/89.39 |
| 3,221,118 | A | * | 11/1965 | Hoover | 200/47 |
| 3,229,544 | A | * | 1/1966 | Haller | 74/89.37 |
| 3,732,744 | A | * | 5/1973 | Rowland | 74/89.37 |
| 3,762,227 | A | * | 10/1973 | Bohnhoff | 74/89.37 |
| 4,266,437 | A | * | 5/1981 | Obergfell | 74/89.37 |
| 4,466,511 | A | * | 8/1984 | Garnett | 188/134 |
| 5,313,852 | A | * | 5/1994 | Arena | 74/89.35 |
| 5,761,963 | A | * | 6/1998 | Hartwig | 74/89.37 |
| 5,895,992 | A | * | 4/1999 | Dreher | 310/80 |
| 5,964,627 | A | * | 10/1999 | Detwiler | 440/58 |

* cited by examiner

*Primary Examiner*—David A. Bucci
*Assistant Examiner*—Colby Hansen
(74) *Attorney, Agent, or Firm*—Reising, Ethington, Barnes, Kisselle & Learman, P.C.

(57) ABSTRACT

A multiple extend ball screw and nut linear actuator incorporates a revolvable axially restrained ball screw with a ball nut thereon. A constant speed reversible drive revolves the screw to move the ball nut forwardly and rearwardly. External helical threads of the same hand as the ball nut threads are provided externally on the ball nut but have a substantially reduced lead. A second rotatably restrained nut having threads matching the external threads on the ball nut mounts on the ball nut and connects to the system to be actuated.

9 Claims, 2 Drawing Sheets

31
20
17
18
14
11
12
29
27
26
23
25
28
16
15
13
20a
19
22
21
M 31
20
13
25
26
12
11
14
19
M 20
14
11
24
30
12
13
M

MULTIPLE STAGE, MULTIPLE EXTEND, SPEED REDUCING BALL SCREW LINEAR ACTUATOR AND METHOD OF CONSTRUCTING AND OPERATING THE ACTUATOR

This application is a continuing patent application of application Ser. No. 09/841,216, filed Apr. 24, 2001 and claims the priority of U.S. provisional application 60/200, 120, filed Apr. 27, 2000. This invention relates to ball screw linear actuators and, more particularly, to multiple stage, sequenced, multiple extend actuators with end of stroke decelerated speed.

BACKGROUND OF THE INVENTION

Conventionally, variable speed motor input drives, are utilized to drive a primary stage ball screw and move a ball nut the greater proportion of the actuator's linear stroke at a relatively high speed, and then are cushioned to abruptly decelerate during the end portion of the stroke. This is normal practice for multiple stage actuators, such as the type shown in the present assignee's U.S. Pat. No. 3,762,227, in which there is a multiple extension of the actuator components in stages, but no provision for providing automatic "end of stroke" speed reduction.

SUMMARY OF THE INVENTION

It is desirable that the actuator be improved so that the drive motor utilized can provide a constant speed input. The invention provides an elongate, revolvable, axially restrained ball screw and accompanying ball nut having thread forming helical land and groove portions which provide a raceway between them for load bearing balls, wherein the ball nut travels a major portion of the stroke of the multiple extend linear actuator. The ball nut is capable of rotation, as well as translation along the ball screw.

An actuator nut, with internal threads, is mounted on the ball nut, which is provided with matching external threads. The hand of the threads of the actuator nut is the same as the hand of the threads of the ball nut, but the actual nut threads have a shorter lead by at least a factor of two. The ball screw is provided with a resilient energy dissipating stop which extends into the path of the ball nut to first decelerate the travel of the ball nut and then to effect a coupling of the screw shaft and ball nut so that they begin rotating as an integrated assembly at the constant speed of the motor. This causes the actuator nut to extend, but at a significantly reduced speed. The reversing stroke of the actuator is similar in that the major portion of the reversing travel is created by the ball nut traveling along the ball screw, the ball screw then being stopped and rigidly coupled with the ball screw to initiate travel of the actuator nut in the reverse direction.

It is a prime object of the present invention to be able to to drive the ball screw at a constant speed during both the forwarding and reversing travel of the linear actuator.

It is a further object of the invention to provide an actuator assembly which is so constructed as to provide a linear deceleration of the ball nut and to effect a coupling of the ball nut to the screw shaft so that the ball screw and the ball nut rotate as a rigid couple which moves the actuate member being actuated at a much reduced speed at the end of the actuator stroke.

Another object of the invention is to provide a relatively durable, maintenance free, multiple stage actuator system which operates smoothly and reliably to effect an actuation of the system to which the actuator nut is connected.

Another object of the invention is to provide an economically available actuator and drive which does not impose undue loads on the system which it operates.

Other objects and advantages of the invention will become apparent with reference to the accompanying drawings and the accompanying descriptive matter.

BRIEF DESCRIPTION OF THE DRAWINGS

The presently preferred embodiment of the invention is disclosed in the following description and in the accompanying drawings, wherein.

GENERAL DESCRIPTION OF THE INVENTION

Figure 1:
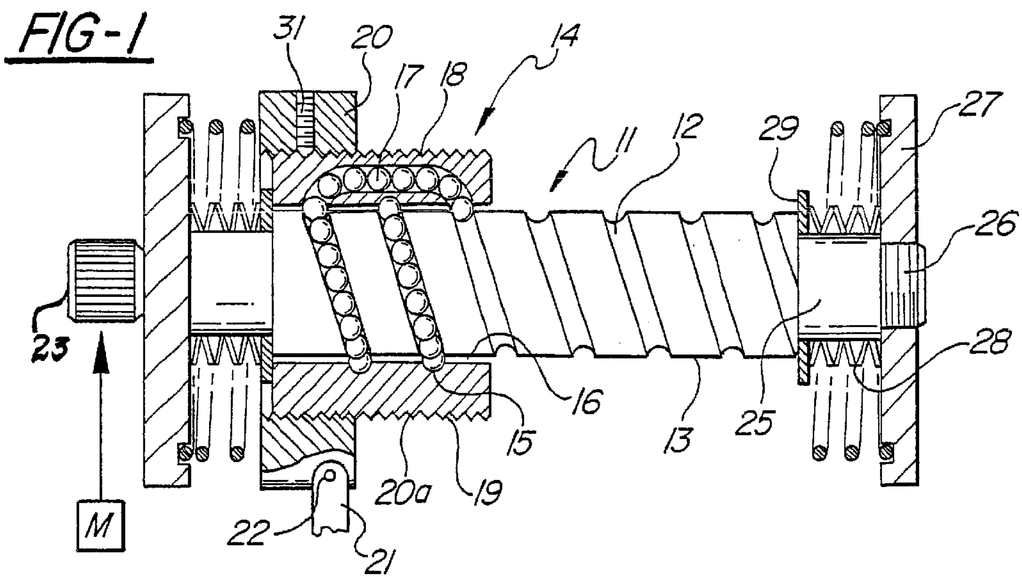
FIG. 1 is a schematic, sectional, side elevational view illustrating the various actuator components in the start position.
Figure 2:
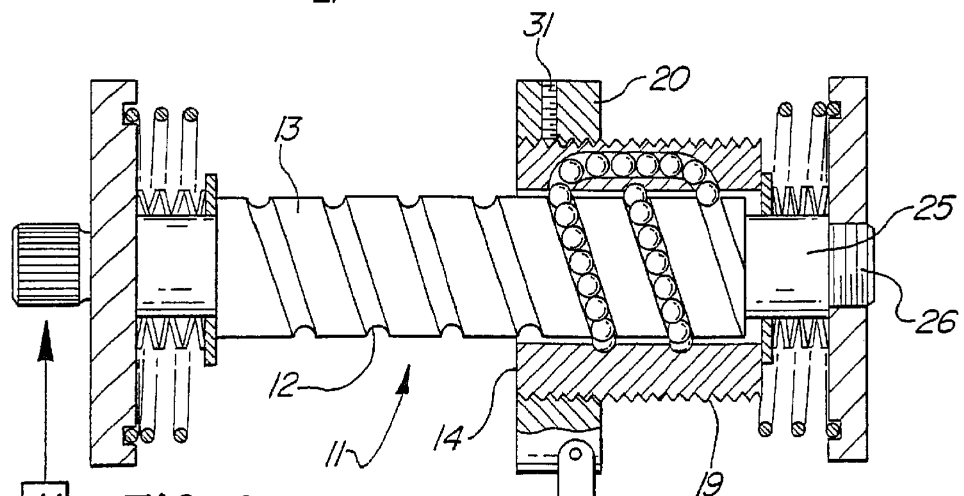
FIG. 2 is a similar view illustrating the ball nut in a forward position in which it is sequencing to revolving travel with the ball screw.
Figure 3:
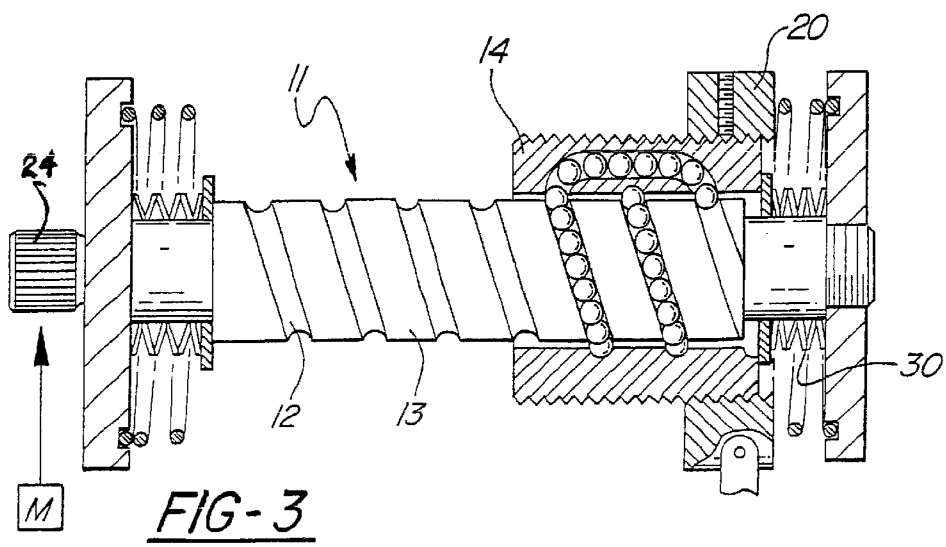
FIG. 3 is a similar view showing the actuator nut as having moved forwardly to a final actuating position.

Referring now more particularly to the accompanying drawings, the actuator assembly in the present invention comprises a typical ball screw 11 provided with helical ball accommodating groove portions 12 separated by land or thread portions 13. Axially provided on the ball screw 11 is a ball nut, generally designated 14, which has matching internal helical groove portions 15 of the same hand and the same pitch or lead as the groove portions 12, and which are separated by helical land portions 16. Provided in the nut to recirculate the abutting load bearing balls 17, which travel in the helical raceway R, is the usual ball return passage 18.

It will be noted that the external surface of the ball nut 14 is externally threaded as at 19 with threads of the same hand as the ball nuts internal threads, but a greatly reduced pitch or lead, and that an actuator nut 20, having matching internal threads **20*a*, is mounted for translatory travel thereon. It is the actuator nut 20 which is connected to the member 21 to be actuated, which, in the present case for purposes of convenience only, is shown as a lever member 21 pivotally connected to the nut 20 as at 22**.

As shown the ball screw 11 has a reduced shaft portion 23 on which a suitable drive gear 24 is provided. Typically the gear 24, which drives the revolveable screw 13 in rotation, may be driven through a gear box or the like by a reversible constant speed electric motor M. At each end of the ball screw 11, a reduced shaft portion 25 of the ball screw 12 is provided with a threaded end 26 to accommodate a stop nut 27. While the nut 27 at each end of the ball screw 11 rotates with the ball screw 11, it may be so mounted to a frame F for the system so as to prevent the ball screw 11 from moving axially.

Provided on the reduced portions 25 at each end of the ball screw 11 are resilient spring damping assemblies, generally designated 28, which can comprise inner end washers 29 and energy absorbing ring springs 30. It will be observed that the threads 14 and 19 are preferable matching Acme threads, which have a significantly greater frictional resistance to travel of the actuator nut 20 on the ball nut 14 than does the ball screw 14 on the elongate ball screw 11. It will further be noted that the actuator nut 20 can mount optional friction-increasing elements, such as a set screw 31, to increase the coefficient of frictional resistance as desired.

The nuts 27, it will be observed, can mount resilient spring assemblies 32 in the path of the actuator nut 20. These are shown as coil springs received within spring mount groove 33 but may be of any suitable configuration.

Figure 5:
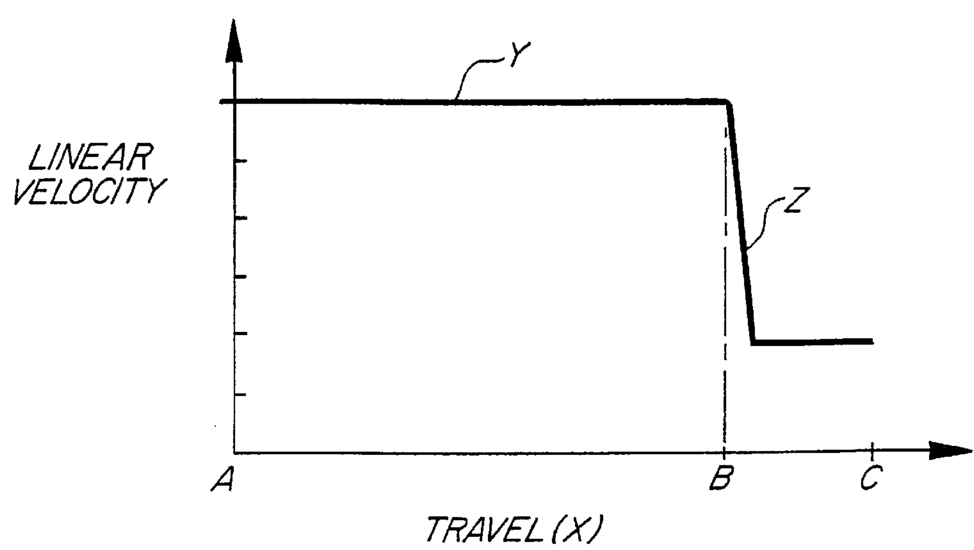
FIG. 5 depicts a typical graph depicting the actuator stroke.

FIG. 5 is a graphical representation of a typical actuator stroke in which linear velocity is plotted against travel. It will be seen that the travel "x" in FIG. 5 of the ball nut 14 is depicted as having the speed value "y" and the travel of the actuator nut 20 is depicted as having the speed value "y/4".

THE OPERATION

The majority of travel of the actuator lever 21 occurs with the ball nut 14 moving translatorily on the ball screw 11 forwardly to contact the spring assembly 28. While the spring assembly 28 is shown as a ring spring assembly, it could consist of resilient rubber pads or a system of coil springs.

Figure 4:
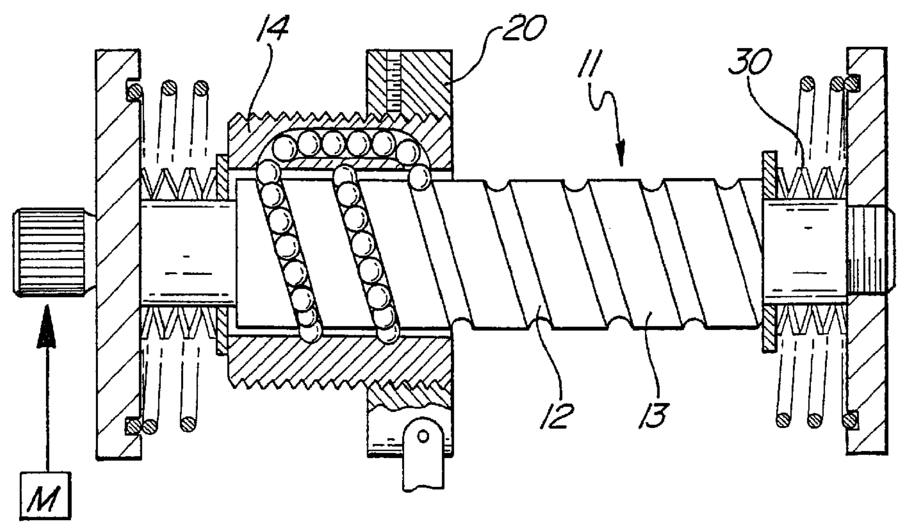
FIG. 4 is a view similar to FIGS. 1–3, but with the ball nut reversed to original position and the actuator nut ready to commence its translatory travel in a reverse direction on the ball nut.

When the ball nut 14 impinges upon the washer 29, the translatory forward travel of the ball nut 14 is sharply reduced as shown in FIG. 5 by the deceleration line "z". When the ball nut 14 almost reaches a virtual stop, it automatically couples to the ball screw 11 and commences to revolve. The rotatably restrained actuator nut 20 then completes the travel of lever 21 at a much reduced "y/4" speed. While the speed "y" in FIG. 5 has been decreased by a factor of 4 near the end of the actuator stroke, it is to be understood that other factors of decrease may be employed. The speed will be reduced, however, by at least a factor of 2. When the lever 21 is to be returned to original position, the motor M is reversed and the ball screw 11 is driven in a reverse direction of rotation. The return trip is also depicted by the graph in FIG. 5 in that the major portion of the trip at higher speed will be accomplished by the ball nut 14 returning to the position in which it is shown in FIG. 4, where it is stopped in the same manner by the stop assembly 28 at the left end of the ball screw in FIGS. 1–4. Thereafter, the ball screw and ball nut 14 will be automatically coupled for rotation and the actuator nut 20, which may be prevented from rotating by the lever 21 or in another manner, will be moved from right to left to the position shown in FIG. 1.

While, conceivably, the actuator nut 20 could be a ball nut with helical ball grooves and lands, matching with like groove and lands provided on the exterior of the ball nut 14, the Acme threads at 19 and 20*a* provide far more frictional resistance which acts to facilitate the reduction of speed at the end of the stroke. The Acme threads chosen, and the addition of one or more efficiency altering adjustable elements 31, can be varied to provide best results for the particular operation. The invention provides a compound automatic linear deceleration at end of stroke both during extension and retraction, eliminating the need for any motor speed control.

The disclosed embodiment is representative of a presently preferred form of the invention, but is intended to be illustrative rather than definitive thereof. The invention is defined in the claims.

We claim:

1. A multiple stage, multiple extend, end of stroke speed reducing, ball screw and nut linear actuator comprising, in combination:

a. a ball screw having helical groove and land portions with a first nut mounted thereon having complemental helical groove portions defining a ball raceway system between the screw and first nut connected with recirculant ball passages;

b. said raceway system having a predetermined hand and lead, and incorporating load bearing balls;

c. a mount system for said screw restraining its axial movement while permitting its rotation;

d. a constant speed reversible drive connected to revolve said screw in one direction at a first constant speed and in the reverse direction, and move said first nut forwardly and rearwardly respectively;

e. external helical groove and land portions of the same hand as said nut groove portion provided on said first nut concentrically with said first nut helical groove portions, but of a substantially reduced lead;

f. a second rotatably restrained nut adapted to be connected to a member to be moved having end of travel speed controlling helical internal groove and land portions complementing said external groove and land portions on said first nut; and g. yieldable members on said screw in the path of said first nut for slowing travel of said first nut axially and causing rotative coupling of said ball screw and first nut and movement of said second nut at a second reduced constant speed axially to extend axial movement of said member in the same direction of axial travel as said first nut at a significantly reduced speed consonant with said reduced lead of said external groove and land portions on said first nut.

2. The actuator of claim 1 wherein said yieldable members are provided at each end of said screw and comprise resilient energy absorbing members providing a speed deceleration zone of travel for said actuator.

3. The actuator of claim 1 wherein said yieldable members comprise spring washers providing a resiliently resisted zone of travel for said first nut.

4. The actuator of claim 1 wherein said external groove and land portions on said first nut and said internal land and groove portions on said second nut are acme threads.

5. The actuator of claim 1 wherein said land and groove portions on said first nut and second nut are of a pitch on the order of one quarter of the pitch of the land and groove portions of said ball screw.

6. The actuator of claim 1 wherein said groove and land portions on said second nut mount an adjustable friction increasing member.

7. The actuator of claim 6 wherein said friction increasing member comprises a set screw received in a groove portion of said second nut in engagement, but not locking engagement with one of said second nut groove portions.

8. The actuator of claim 1 wherein resilient stop members are provided surrounding said yield members opposite each end of said second nut in the path thereof.

9. The actuator of claim 1 wherein said reduced lead of the land and groove portions of said first and second nuts is at least half the lead of said land and groove portions of said ball screw.

* * * * *